(12) United States Patent
Nachum et al.

(10) Patent No.: US 8,208,380 B1
(45) Date of Patent: Jun. 26, 2012

(54) LOSSLESS SYSTEM SUPPORT USING CIRCULAR BUFFER ALLOCATION

(75) Inventors: Youval Nachum, RiShon LeZion (IL); Carmi Arad, Nofit (IL)

(73) Assignee: Marvell Israel (M.I.S.L) Ltd., Yokneam (IE)

( * ) Notice: Subject to any disclaimer, the term of this patent is extended or adjusted under 35 U.S.C. 154(b) by 283 days.

(21) Appl. No.: 11/944,001

(22) Filed: Nov. 21, 2007

Related U.S. Application Data (60) Provisional application No. 60/866,963, filed on Nov. 22, 2006.

(51) Int. Cl.
*H04L 12/56* (2006.01)

(52) U.S. Cl. ......... 370/236; 370/235; 370/412; 370/415

(58) Field of Classification Search .................. 370/235, 370/236, 395.71, 395.72, 412, 415
See application file for complete search history.

(56) References Cited

U.S. PATENT DOCUMENTS

| | | | |
|---|---|---|---|
| 5,650,993 A * | 7/1997 | Lakshman et al. | 370/236 |
| 5,978,868 A * | 11/1999 | Maas | 710/52 |
| 6,026,075 A * | 2/2000 | Linville et al. | 370/236 |
| 6,795,886 B1 * | 9/2004 | Nguyen | 710/310 |
| 7,061,868 B1 * | 6/2006 | Ahlfors et al. | 370/236 |
| 7,593,329 B2 * | 9/2009 | Kwan et al. | 370/230 |
| 2004/0003069 A1 * | 1/2004 | Wong | 709/223 |
| 2005/0018708 A1 * | 1/2005 | Prasad et al. | 370/462 |
| 2005/0114498 A1 * | 5/2005 | Gonzalez et al. | 709/224 |
| 2005/0129046 A1 * | 6/2005 | Kumar et al. | 370/428 |
| 2005/0259575 A1 * | 11/2005 | Krishnamurthi et al. | 370/229 |
| 2006/0268709 A1 * | 11/2006 | Singla et al. | 370/235 |
| 2008/0089351 A1 * | 4/2008 | Hu | 370/412 |

* cited by examiner

*Primary Examiner* — Dang Ton
*Assistant Examiner* — Robert M Morlan (57) ABSTRACT

In a memory management system, data packets received by input ports are stored in a circular buffer and queues associated with output ports. To preserve the packets stored in the buffer and prevent a head-drop event from occurring, a lossless system control component sends flow control commands when the difference between the oldest read pointer and the write pointer is less than a configurable transmission off threshold. The flow control commands pause the transmission of data packets to the input ports while enabling output ports to transmit stored data packets. When the difference between the oldest read pointer and the write pointer exceeds a configurable transmission on threshold, the lossless system controller ceases issuing flow control commands, and the input ports can resume receiving data packets.

18 Claims, 7 Drawing Sheets

LOSSLESS SYSTEM SUPPORT USING CIRCULAR BUFFER ALLOCATION

CROSS REFERENCE TO RELATED APPLICATIONS

The present application claims the benefit of co-pending U.S. provisional application Ser. No. 60/866,963, filed on Nov. 22, 2006, the disclosure of which is incorporated herein by reference in its entirety.

BACKGROUND OF THE INVENTION

1. Field of the Invention

This invention relates generally to packet switching, and more particularly to extending a circular buffer allocation policy to support lossless systems.

2. Description of the Related Art

A packet network transmission device receives packets at one or more ingress ports, and transmits the packets from one or more egress ports. Within such a transmission system there are one or more queues for each ingress and egress port. A packet memory holds packets temporarily while the packets are being processed and queued for transmission by the network device. A common method to manage packet memory is to split it into fixed size units, called buffers. In this kind of scheme, every packet is stored in one or more buffers. Consequently, a buffer may be in one of two states: free, or allocated to a packet.

Figure 1:
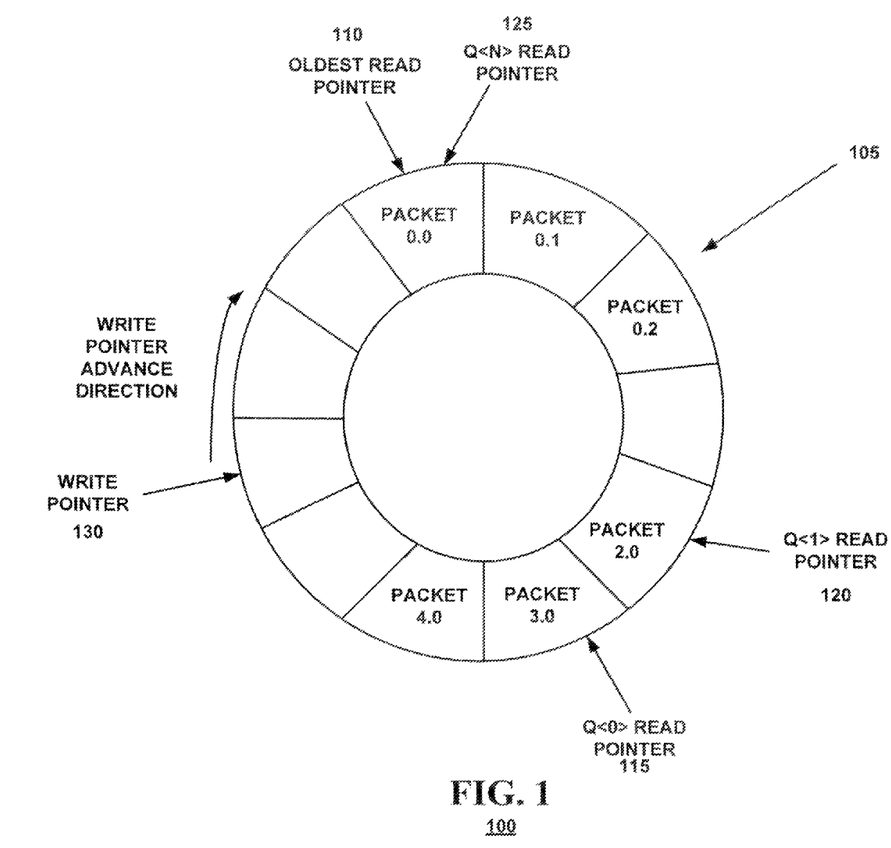
FIG. 1 illustrates a circular buffer.

A buffer manager controls the allocation and release of buffers. One known buffer management scheme is called a "circular buffer". An embodiment of a circular buffer 100 is shown in FIG. 1. Packets may be stored, as they are received, by a computer process, or by a device receiving port, such as may be found in a switch. At the same time, the packets may be read by another computer process, or by a device transmitting port in the switch.

FIG. 1 shows four packets. A first packet, packet #0, is in three parts, and therefore is long enough to occupy three buffers. The first part, <0.0>, is pointed to by Q<N> read pointer 125. The next buffer (looking clockwise in FIG. 1) is empty because the packet that was in that buffer (packet 1.0) has been read. Packet 2.0 follows packet 1.0, and is pointed to by Q<1> read pointer 120. Packet 3.0 follows packet 2.0, and is pointed to by Q<0> read pointer 115. In the term "Packet x.y," x reflects the arrival order of packets to the switch (which is also the write order to the packet memory), and y reflects the buffer sequence number occupied by packet x. As packets may be queued to different queues, Q<N> is the read pointer of queue N which points to the packet the head of queue N. Following this terminology, packet 4.0 would not be pointed to by any Q read pointer because that packet is not in the head of an queue.

Write pointer 130 advances in the direction of the clockwise arrow shown in FIG. 1, and points to a location where a packet may be written. The oldest read pointer 110 points to the oldest packet in the circular buffer 100. In FIG. 1, packet 1.0 may have been read before packet 0.0, for example, because packet 1.0 is a higher priority.

Figure 2:
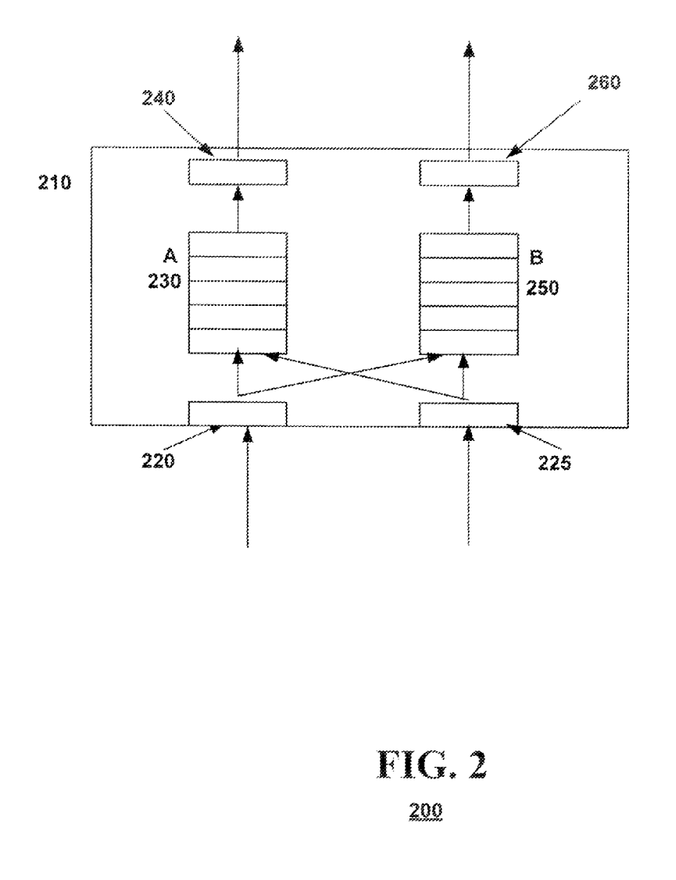
FIG. 2 illustrates a simplified block diagram of a networking device.

FIG. 2 illustrates a simplified block diagram of one embodiment of a networking device 210 which may be a hub, switch, router, or any other device which receives and transmits data. The device 210 may have input ports 220, 225 which receive data from a remote source, queues 230, 250 which store data to be transmitted by the device 210, and output ports 240, 260 which transmit data stored in the queues 230, 250. The queues 230, 250 may be first-in-first-out (FIFO) queues, in which data is stored and operated on in the order in which the data was received by the device 210. The data received by the input ports 220, 225 of the device 210 may be in the form of data packets, as discussed earlier. These data packets may be of a fixed size or variable size. The device 210 may receive and transmit these data packets at asynchronous speeds. For instance, the device 210 may receive data packets at a rate of 1 GBit per second, while transmitting the packets at a rate of 100 MBit per second. Other rates, faster or slower than these, are possible.

Where packet reception and transmission are asynchronous, the reception rate may be much faster than the transmission rate. When this happens, the queue(s) will tend to fill quickly. In a circular buffer scheme, in which one circular buffer associated with all of the ingress ports shown in FIG. 2, when the last location is filled, the system may decide to discard the newest packet, and not write it into the buffer, or may decide to discard the oldest packet (pointed to by the oldest read pointer), and replace it with the newest packet. The first situation is referred to as tail-drop, and the second situation is referred to as head-drop. Either situation results in packet loss.

It would be desirable to have a circular buffer allocation policy to support devices which employ lossless systems. It also would be desirable to have a lossless system which can pause every ingress port individually.

SUMMARY OF THE INVENTION

To address the stated need and fulfill other desired objectives, in accordance with one embodiment of the invention, to prevent a head-drop event from occurring, flow control commands may be sent by a lossless system controller when the difference between the oldest read pointer and the write pointer is less than a configurable transmission off (XOFF) threshold. The flow control commands may pause the transmission of data packets to the input ports while enabling output ports to transmit stored data packets. In one embodiment, each ingress port may be paused individually. When the difference between the oldest read pointer and the write pointer exceeds a transmission on (XON) threshold, the lossless system control component may cease issuing flow control commands, and the input ports may resume reception of data packets.

BRIEF DESCRIPTION OF THE DRAWINGS

FIGS. 3a-3e illustrate a simplified block diagram of one embodiment of a networking device and accompanying circular buffers.

DETAILED DESCRIPTION OF EMBODIMENTS

Figure 3A:
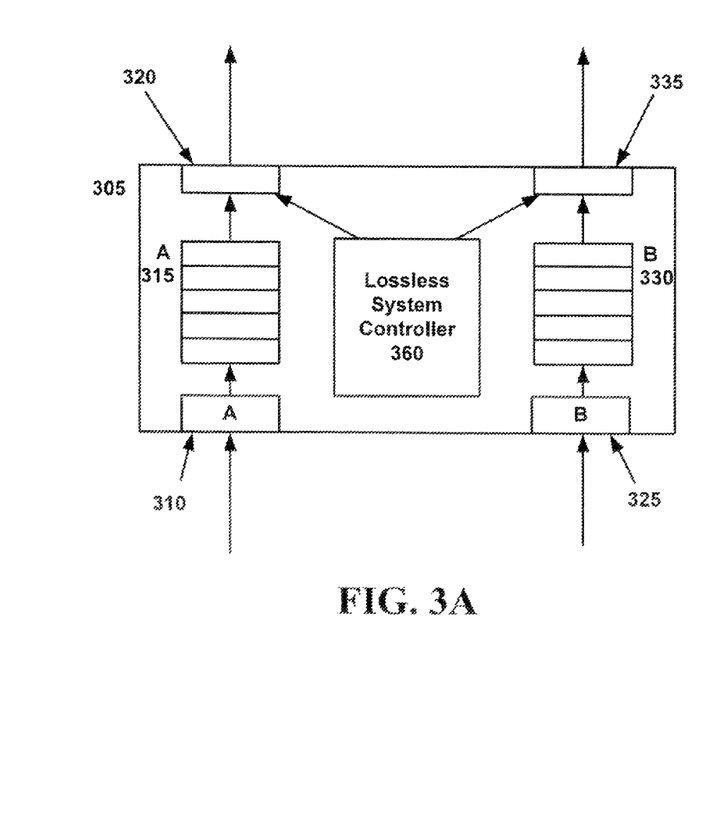
Figure 3B:
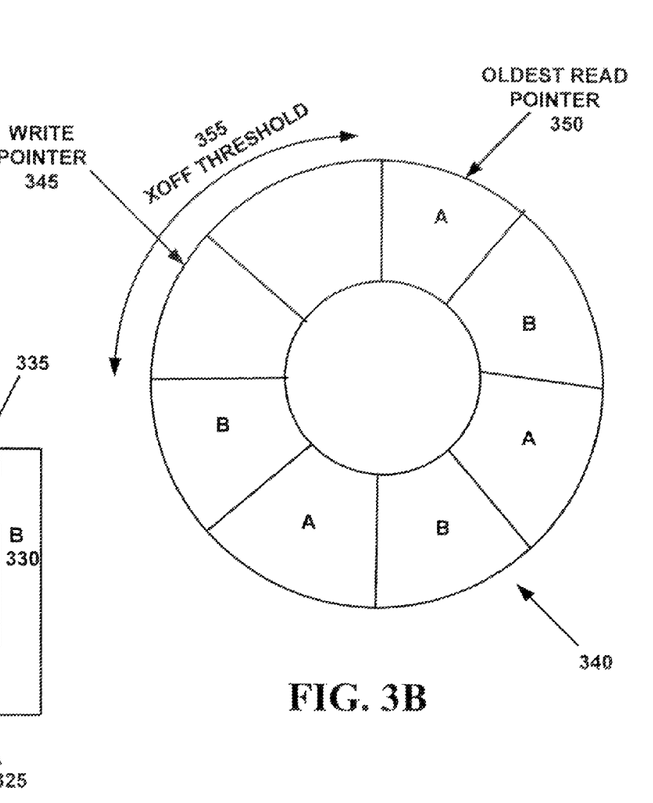
Figure 3C:
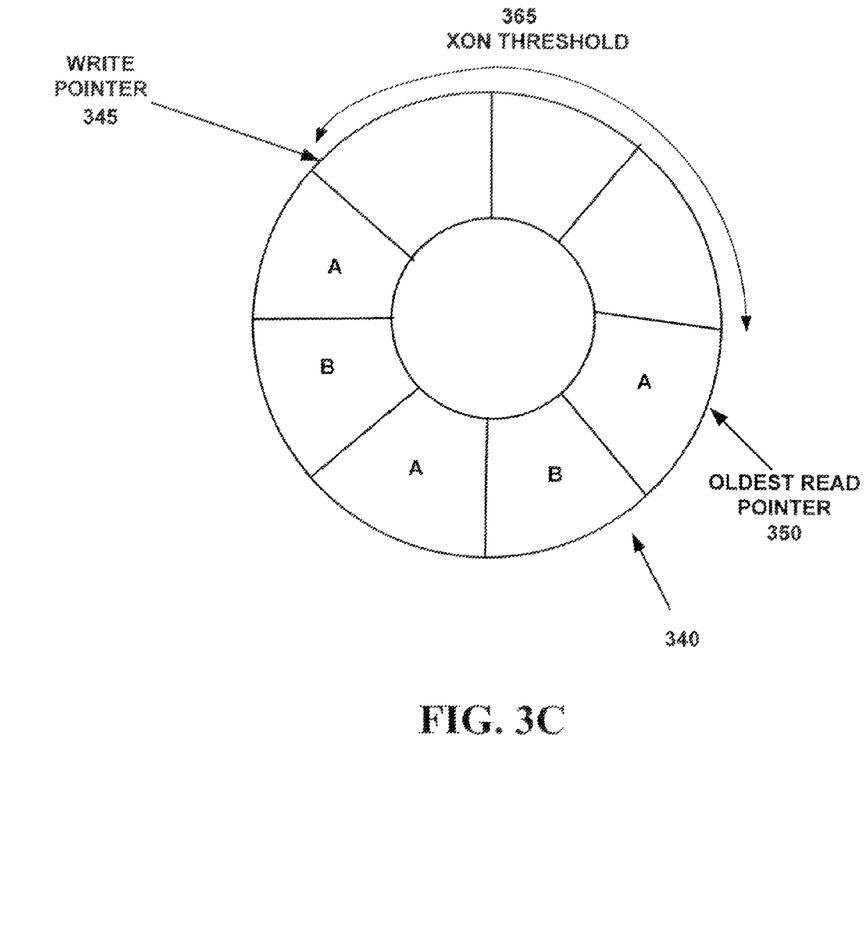

FIGS. 3a-3c illustrate a simplified block diagram of one embodiment of a networking device and accompanying circular buffers. The networking device of FIG. 3a may represent a switch, hub, router, or any other network infrastructure that receives data and transmits data. In one embodiment, the networking device 305 may include two input ports 310, 325, two queues 315, 330, and two output ports 320, 335. A circular buffer 340, as shown in FIG. 3b, may be allocated in the memory of the device 305. As data in the form of packets is received by input ports 310, 325, the data may be written to the circular buffer 340 and placed in respective queues 315, 330 associated with the output ports 320, 335. Read pointers (not shown) associated with the queues may track the data written to the circular buffer 340. A global oldest read pointer 350 may point to the data packet which is the earliest received among the data packets stored in the circular buffer 340. A write pointer 345 may identify a free buffer address in which to write a received data packet. The read pointers, global oldest read pointer 350, and write pointer 345 all may traverse the circular buffer 340 following a respective read or write operation.

Circular buffer allocation policies have required the use of a tail drop, a head-drop, or other disposal of a data packet stored in the circular buffer 340 if the circular buffer 340 is full and additional data packets continue to be written to the circular buffer 340. The head-drop generally is triggered when the write pointer 345 and the oldest read pointer 350 point to the same buffer. When a head-drop is triggered, the stored data packet is deleted and the circular buffer data structures are updated, such as by causing the oldest read pointer 350 to traverse the circular buffer 340 to find the next oldest data packet and removing the deleted packet from a queue. When a tail drop is triggered, the incoming data packet is discarded. For lossless systems, packet drops of any kind are not desirable as lossless systems aim to preserve data packets stored within the system until the packets are transmitted. As a result, one embodiment for adapting a circular buffer to a lossless system is to employ flow control commands or frames to preserve the stored data packets.

In one embodiment, the device of FIG. 3a may have two input ports A 310 and B 325, where both input ports A 310 and B 325 receive data at a rate of 100 MBit per second, and two output ports 320, 335, where output port 320 transmits data at a rate of 100 MBit per second, but output port 335 transmits data at a rate of only 10 MBit per second. Again, other input and output rates, including other differential rates, are possible (including but not limited to, for example, 1 GBit/sec. in and 100 MBit/sec, out). As a result, input port A 310 and its corresponding output port 320 receive and transmit data simultaneously or nearly simultaneously. Data packets received by input port A 310 are written to the circular buffer 340 and read almost immediately after being written. However, in the described embodiment input port B 325 receives data packets ten times as fast as they are transmitted by its corresponding output port 335, so that the circular buffer 340 will fill with packets received by input port B 325. As these packets are written to circular buffer locations pointed to by the write pointer 345, the write pointer 345 traverses the circular buffer 340, pointing at free buffers in which to write these received data packets. However, because the output port 335 associated with input port B 325 transmits packets more slowly than input port B 325 receives them, a packet drop situation (either a head drop or a tail drop) may ensue rather quickly, depending on the amount of memory allocated to the circular buffer.

Looking now at FIG. 3b, in order to prevent a head-drop from occurring, a transmission off threshold 355 may be employed to anticipate and prevent a head-drop situation from occurring. According to one aspect of the invention, when the difference between the oldest read pointer location and the write pointer location is less than a predetermined transmission off threshold 355, a transmission off scenario is triggered, and an XOFF frame is transmitted. In response to this scenario, a lossless system controller 360 may transmit flow control frames to remote transmitting nodes or ports, resulting in a cessation of data packet transmissions from those nodes or ports to the input ports 310, 325 of the networking device 305. In one embodiment, the lossless system controller 360 may transmit the flow control frames through the output ports 320, 335. The pause in packet transmission caused by the flow control frames may enable the device to rid itself of packet congestion by enabling the output ports 310, 325 of the device 305 to continue transmitting packets while the input ports 310, 325 are idle. The transmission off threshold 355 may be configurable and in certain circumstances may be dependent on specifications describing allowed latency for networking devices or on the network round trip time for a packet to be transmitted from one node or port to another. After the issuance of an XOFF frame, the input ports 310, 325 may continue to receive data packets for a short amount of time, generally equivalent to the amount of time it takes for the flow control frames to reach the remote node or ports.

In this embodiment, as incoming data packets are prevented from being received by the input ports 310, 325, and output ports 320, 335 continue to transmit stored packets, the write pointer 345 will remain stationary, as no write operations can occur in the circular buffer 340 in the absence of received data packets. The oldest read pointer 350, however, may continue to traverse the circular buffer 340, as packets are read from the circular buffer 340 and transmitted by the output ports 320, 335. As a result, the interval between the write pointer 345 and the oldest read pointer 350 may widen until the interval exceeds a configurable transmission on threshold 365. When the interval does exceed the transmission on threshold 365, the lossless system controller 360 sends an XON frame to the remote transmitting port or node, and the input ports 310, 325 may once again begin receiving data packets.

In certain circumstances, it may be desirable to employ flow control for fewer than all of the input ports in the networking device. This means that there should be at least one circular buffer for ports that do not support flow control and one circular buffer for ports that support flow control. For ports that support flow control there should be one circular buffer per port. Certain input ports may have a higher priority over other input ports, and maintaining input/output operation of a higher priority port may take precedence over quick elimination of packet congestion. With the above described flow control, an XOFF frame may be sent to certain remote nodes or ports transmitting to the input ports of the device. Thus, in one embodiment, the lossless system controller may transmit flow control frames to certain transmitting nodes or ports to pause the transmission of lower priority data packets to the networking device. Higher priority data packets may continue to be transmitted to the higher priority input port. For example, a networking device may have a first input and output port dedicated to Voice over IP (VoIP) traffic, which usually is higher priority, for reasons related to issues such as avoidance of dropped packets or frames, and a second input and output port for Internet web browsing traffic, which usually is lower priority, if this device suffers from packet congestion, the networking device may place a higher priority on data packets related to VoIP to ensure no loss of data packets corresponding to real-time voice data. To alleviate packet congestion, the device may only send an XOFF frame to remote transmitting ports sending packets related to internet web browsing, while enabling other remote ports and nodes to continue sending VoIP-related data packets. If one remote transmitting port or node is sending both VoIP-related data packets and Internet web browsing packets, the lossless system control component may send an XOFF frame instructing the remote port or node to pause the Internet web browsing packets, but to continue to send the VoIP-related packets.

For known high priority communications such as VoIP, circuitry to accommodate transmission of XOFF frames, including the above-described circular buffer scheme, may be avoided on the ports that handle VoIP. In such circumstances, appropriate bandwidth may be allocated to such high priority communications in advance, and the circular buffer scheme for lossless transmission may be provided just for ports handling lower priority communications.

In certain circumstances, a flow control pause frame sent by the lossless system controller may be received by a remote transmission node or port with errors due to noise or other factors. As a result, the remote transmission node or port may not pause its transmission of data packets to a corresponding input port in the networking device. Accordingly, the input port may continue to receive data packets, and the write pointer may continue to identify buffer addresses for the writing of data packets, in this circumstance, with the flow control pause frames not being received, as the write pointer approaches the buffer location pointed to by the oldest read pointer, the lossless system controller must stop the writing of received data packets to the queue and circular buffer, thereby halting the traversal of the write pointer around the circular buffer and preventing a head-drop event from occurring. To stop the writing, the lossless system controller must perform a tail drop by discarding data packets received by the corresponding input port prior to the writing of the data packets to the queue and circular buffer.

Figure 4A:
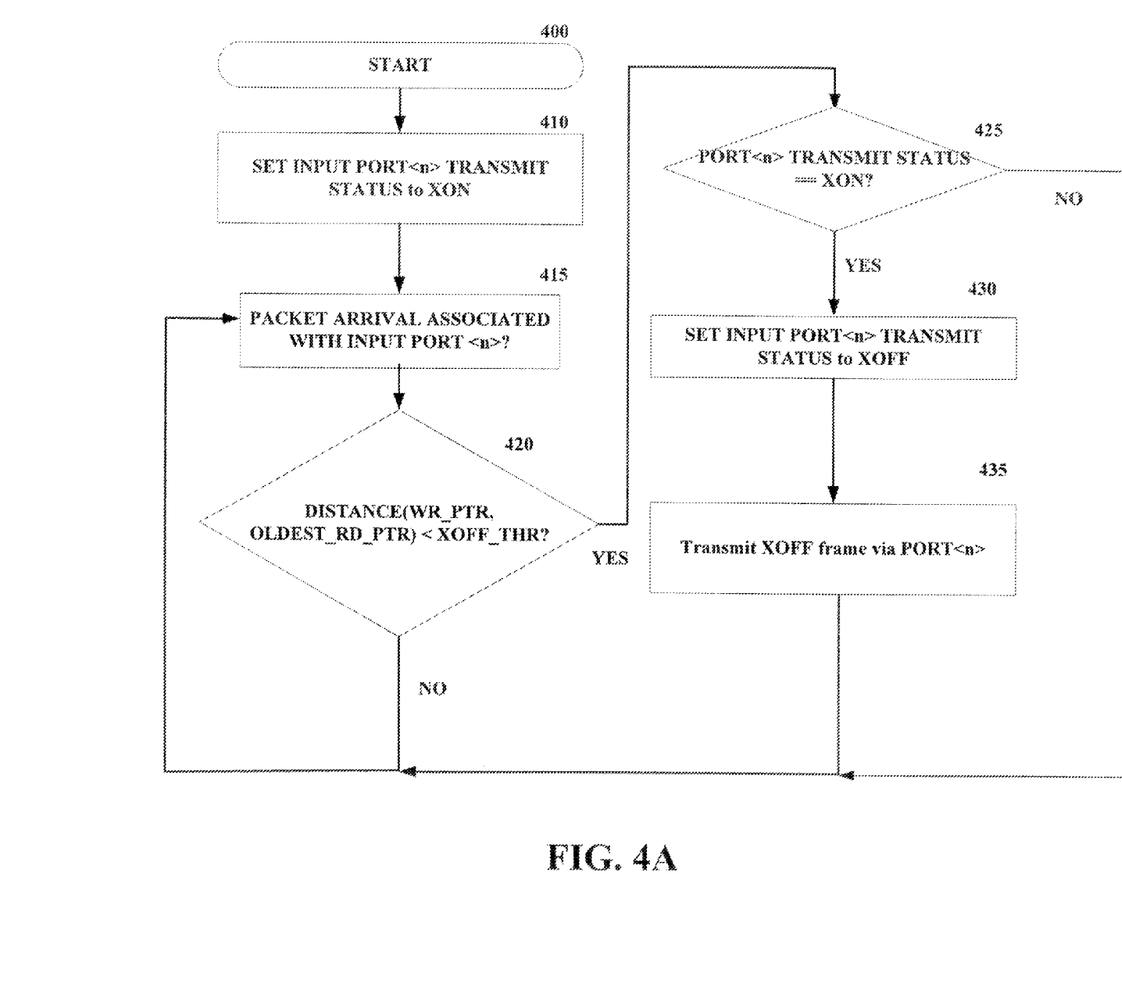
FIGS. 4a-4b illustrate in flowchart form one embodiment of a method for using a circular buffer for a lossless system.
Figure 4B:
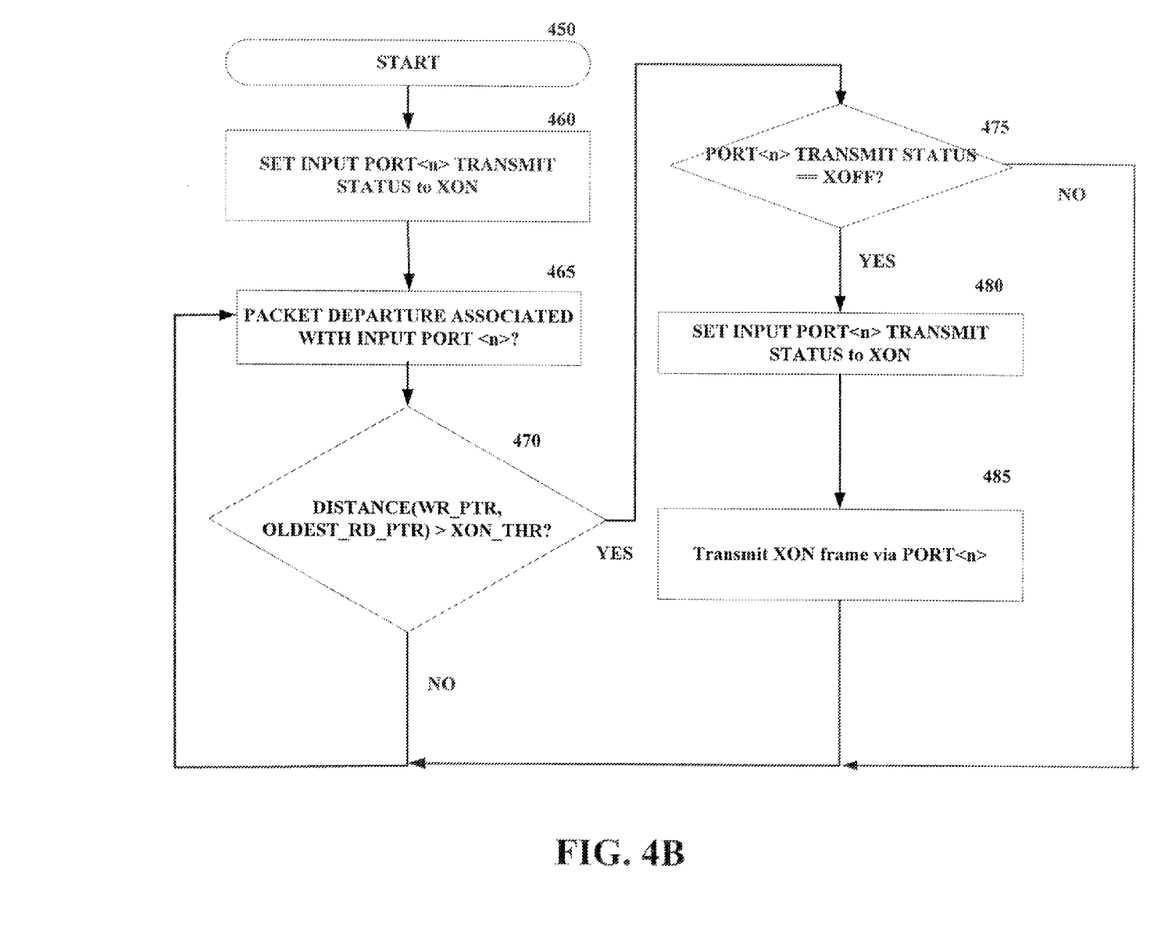

FIGS. 4a and 4b are flowcharts illustrating one embodiment of a method for using a circular buffer for a lossless system. The illustrated operation in each figure deals with a single port, but it should be understood that, as appropriate, the operation may be applied to multiple ports, and in particular to the provision of a circular buffer for each ingress port in which flow control is desired.

In FIG. 4a, in block 410, transmit on (XON) status is set at input port, n . . . . In block 415, if a packet is arriving at that input port, the distance between the write pointer and the oldest read pointer is monitored. In decision block 420, a distance between the oldest read pointer and the write pointer is compared to a first variable or configurable threshold XOFF_THR. As the write pointer and oldest read pointer each traverse the circular buffer, the distance between the two may increase or decrease depending on the rate at which data is received by the input port and the rate at which data is transmitted by the output port. If the write pointer and the oldest read pointer traverse the circular buffer and point to the same stored data packet, a head-drop event may occur, resulting in the deletion or overwriting of a stored data packet. As a lossless system seeks to prevent stored data from being deleted or overwritten prior to the data's transmission or processing, flow control may be used to prevent the occurrence of a head-drop event. Thus, if the distance between the oldest read pointer and the write pointer is less than the first variable threshold (i.e., oldest_read_ptr−write_ptr<XOFF), in block 425, it is determined whether that port's transmit status is on. If it is on, the status is changed to XOFF in block 430. If it is not, packet arrival is monitored, and the distance between the oldest read pointer and the write pointer is compared again to XOFF_THR.

At block 435, after the port transmit status is changed to XOFF, an XOFF frame is transmitted via port <n>, and flow control frames may be transmitted to the remote transmitting node to halt transmission of packets to the input port <n> corresponding to the remote transmitting node.

Looking now at FIG. 4b, in a situation in which a packet is to be transmitted from port <n>, transmit status is set to XON in block 460. Packet departure is monitored in block 465, and when a packet is departing, to determine if packet congestion has been resolved, a distance between the oldest read pointer and the write pointer is compared to a second variable or configurable threshold (i.e., oldest_read_ptr−write_ptr>XON) in block 470. If the distance between the oldest read pointer and the write pointer is not greater than the second variable threshold, the lossless system controller may continue sending flow control frames to the remote transmitting node, as the packet congestion in the device has not subsided. If the distance is greater than the second variable threshold, then in block 475 the transmit status of port <n> is checked to see if it is XOFF. If it is, in block 480 the status is changed to XON, and an XON frame is transmitted via port <n>, thereby ceasing the sending of flow control frames, and permitting the remote transmitting node to resume transmission of data packets to the input port of the networking or buffering device. If it is not, packet departure is monitored, and the distance between the oldest read pointer and the write pointer is compared again to XON_THR.

Figure 5A:
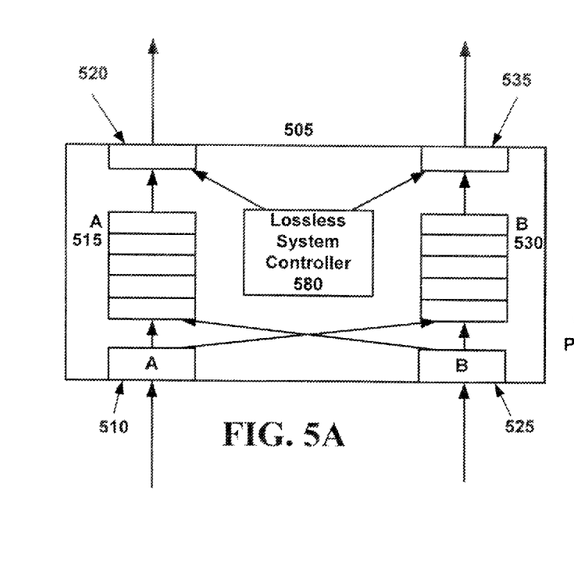
FIGS. 5a-5c illustrate a simplified block diagram of one embodiment of a networking device and accompanying circular buffers.
Figure 5B:
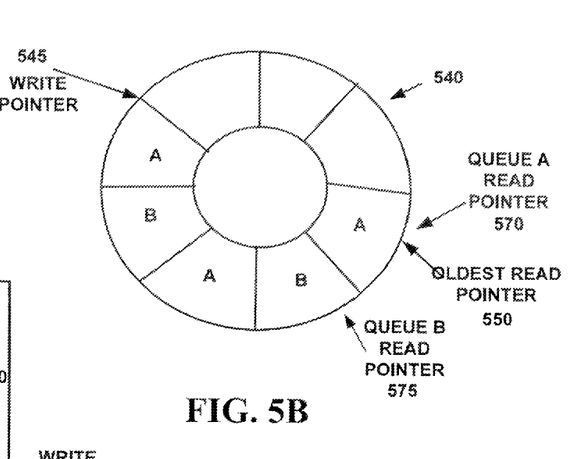
Figure 5C:
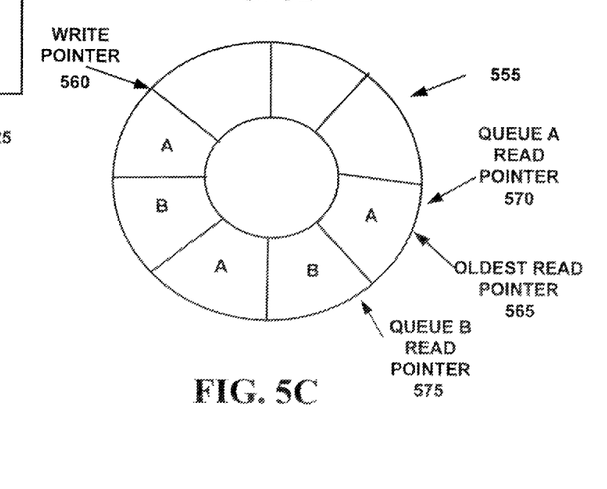

FIGS. 5a-5c illustrate a simplified block diagram of one embodiment of a networking device having a circular buffer for each input port. Given that flow control implementation may cause all input ports in a device to cease receiving incoming data packets to the detriment of the input/output ports that do not cause packet congestion, a circular buffer 540, 555 may be allocated for each input port 510, 525 in a networking device 505. In this embodiment, a device 505 may have two input ports A 510 and B 525, two output ports 520, 535, and two queues 5155, 530 associated with the two output ports. Two circular buffers 540, 555 may be allocated (in one embodiment, statically in memory) to store data packets received by the two input ports 510, 525. Each circular buffer may have a write pointer 545, 560, an oldest read pointer 550, 565, and a read pointer(s) 570, 575 common to the circular buffers, as the data packets stored in each circular buffer may be ultimately transmitted by either output port through either queue. As a result, the number of read pointers employed in the circular buffers may be equal to the number of queues in the device. By employing separate circular buffers for each input port, flow control may be implemented on a per port basis, so that ports which do not contribute to packet congestion may continue to receive and transmit packets.

In one embodiment, for a networking device and circular buffer(s) as shown in FIGS. 3 and 5, the number of queues maintained may correspond linearly to the number of output ports in the device. Since each queue may hold data packets stored in multiple circular buffers (i.e. packets received by multiple input ports), it is possible that a head-drop event in one of the circular buffers may not result in the packet being dropped from the head of the queue. As discussed herein, in a lossless system according to the present invention, head drop is avoided. In corner cases such as a case in which an XOFF frame is not received, and packet discard is required, a tail drop will be carried out.

Embodiments of the invention described above may be used in or incorporated into memory management systems which use buffers and queues to store or hold data received from one location or process and transmitted to another location or process. These memory management systems may be incorporated into network infrastructure devices, such as hubs, switches, and routers, regardless of the number of input and output ports possessed by these devices. While the above embodiments have been described with regards to networking devices having physical ports, the memory management systems also may be incorporated in computing devices where data is sent from one process to another process and temporarily held and stored in buffers and queues. Further, embodiments of the invention may apply to any lossless system where data preservation is desired.

In addition to these exemplary embodiments, those skilled in the art will recognize that numerous applications of the above-described embodiments are possible, and that disclosure of the just-described applications does not limit the invention to these applications. Rather, all suitable applications fall within the scope of the invention. For example, as alluded to above, circular buffers may be allocated on a per-port basis, or on a per-{port, priority} basis. Therefore, the foregoing is illustrative only of the principles of the invention. Further, those skilled in the art will recognize that numerous modifications and changes are possible, the disclosure of the just-described embodiments does not limit the invention to the exact construction and operation shown, and accordingly, all suitable modifications and equivalents fall within the scope of the invention.

What is claimed is:

1. A network device, comprising:
   a plurality of ports;
   a memory;
   a memory management system configured to:
      maintain, for each input port in a plurality of input ports, a respective circular buffer, and
      for each circular buffer, maintain i) a respective read pointer for each queue in a plurality of queues, ii) an oldest read pointer, and iii) a write pointer, wherein each queue corresponds to a respective output port in a plurality of output ports; and
   a controller configured to, for each input port, transmit i) a first command to halt transmission, by a remote node, of the data packets to the input port when a distance between the write pointer corresponding to the input port and the oldest read pointer corresponding to the input port is less than a first threshold, and ii) a second command to resume transmission, by the remote node, of the data packets to the input port when the distance between the write pointer corresponding to the input port and the oldest read pointer corresponding to the input port is greater than a second threshold.

2. A network device according to claim 1, wherein the memory management system is configured to, for each input port:
   upon transmitting an earliest received packet to which the oldest read pointer points, cause the oldest read pointer to traverse the respective circular buffer to identify a next earliest received packet from amongst,
   upon writing, to the respective circular buffer, a next packet received via the input port, cause the write pointer to traverse the respective circular buffer to identify a next free buffer in the circular buffer.

3. A network device according to claim 1, wherein the memory management system is configured to, for each queue in the plurality of queues, maintain:
   the respective read pointer, wherein the respective read pointer identifies a first packet in the respective circular buffer from amongst packets received via the input port corresponding to the circular buffer, the first packet for transmission via the output port, wherein upon transmission of the first packet, the respective read pointer traverses the circular buffer to identify a second packet in the circular buffer from amongst packets received via the input port corresponding to the circular buffer, wherein the second packet occupies a next queue position in the queue.

4. A network device according to claim 1, wherein the memory management system is configured to:
   allocate in the memory an additional plurality of buffers,
   maintain the additional plurality of buffers as a circular buffer system in which to store packets received via a first set of multiple ports,
   determine an earliest received packet in the circular buffer system from amongst i) packets received via the first set of multiple ports and ii) packets to be transmitted via a second set of multiple of ports, and
   drop the earliest received packet in any of the buffers of the circular buffer system when there is insufficient space in the circular buffer system to store a packet newly received from any of the ports in the first set of multiple ports.

5. A network device according to claim 1, wherein the memory management system is configured to, for each input port, drop a packet received via the input port when the write pointer and the oldest read pointer both point to a same buffer location.

6. A memory management system, comprising:
   a memory;
   a controller configured to:
      allocate in the memory a plurality of buffers,
      maintain, for each input port in a plurality of input ports, a respective buffer in the plurality of buffers as a respective circular buffer,
      for each circular buffer, maintain i) a respective read pointer for each queue in a plurality of queues, ii) an oldest read pointer, and iii) a write pointer, wherein each queue corresponds to a respective output port in a plurality of output ports,
      cause a first command to be transmitted when a distance between the write pointer corresponding to the input port and the oldest read pointer corresponding to the input port is less than a first threshold, the first command to halt transmission, by a remote node, of the data packets to the input port, and
      cause a second command to be transmitted when the distance between the write pointer corresponding to the input port and the oldest read pointer corresponding to the input port is greater than a second threshold, the second command to resume transmission, by the remote node, of the data packets to the input port.

7. A memory management system according to claim 6, wherein the controller is configured to for each input port:
   upon transmitting an earliest received packet to which the oldest read pointer points, cause the oldest read pointer to traverse the respective circular buffer to identify a next earliest received packet from amongst packets received via the input port, and
   upon writing, to the respective circular buffer, a next packet received via the input port, cause the write pointer to traverse the respective circular buffer to identify a next free buffer in the circular buffer.

8. A memory management system according to claim 6, wherein the controller is configured to, for each queue in the plurality of queues, maintain:
   the respective read pointer, wherein the respective read pointer identifies a first packet in the respective circular buffer from amongst packets received via the input port corresponding to the circular buffer, the first packet for transmission via the output port, wherein upon transmission of the first packet, the respective read pointer traverses the circular buffer to identify a second packet in the circular buffer from amongst packets received via the input port corresponding to the circular buffer, wherein the second packet occupies a next queue position in the queue.

9. A memory management system according to claim 6, wherein the controller is configured to:
allocate in the memory an additional plurality of buffers,
maintain the additional plurality of buffers as a circular buffer system in which to store packets received via a first set of multiple ports,
determine an earliest received packet in the circular buffer system from amongst i) packets received via the first set of multiple ports and ii) packets to be transmitted via a second set of multiple of ports, and
drop the earliest received packet in any of the buffers of the circular buffer system when there is insufficient space in the circular buffer system to store a packet newly received from any of the ports in the first set of multiple ports.

10. A memory management system according to claim 9, wherein the controller is configured to, for each input port, cause a packet received via the input port to be dropped when the write pointer and the oldest read pointer both point to a same buffer location.

11. A method of memory management in a network device, comprising:
allocating in a memory a plurality of buffers;
maintaining, for each input port in a plurality of input ports, a respective buffer in the plurality of buffers as a respective circular buffer;
maintaining, for each circular buffer, i) a respective read pointer for each queue in a plurality of queues, ii) an oldest read pointer, and iii) a write pointer, wherein each queue corresponds to a respective output port in a plurality of output ports;
transmitting a first command when a distance between the write pointer corresponding to the input port and the oldest read pointer corresponding to the input port is less than a first threshold, the first command to halt transmission, by a remote node, of the data packets to the input port; and
transmitting a second command when the distance between the write pointer corresponding to the input port and the oldest read pointer corresponding to the input port is greater than a second threshold, the second command to resume transmission, by the remote node, of the data packets to the input port.

12. A method according to claim 11, further comprising:
upon transmitting an earliest received packet to which the oldest read pointer points, causing the oldest read pointer to traverse the respective circular buffer to identify a next earliest received packet from amongst packets received via the input port; and
upon writing, to the respective circular buffer, a next packet received via the input port, causing the write pointer to traverse the respective circular buffer to identify a next free buffer in the circular buffer.

13. A method according to claim 11, wherein the method comprises, for each queue in the plurality of queues:
maintaining the respective read pointer, wherein the respective read pointer identifies a first packet in the respective circular buffer from amongst packets received via the input port corresponding to the circular buffer, the first packet for transmission via the output port, wherein upon transmission of the first packet, the respective read pointer traverses the circular buffer to identify a second packet in the circular buffer from amongst packets received via the input port corresponding to the circular buffer, wherein the second packet occupies a next queue position in the queue.

14. A method according to claim 11, further comprising:
allocating in the memory an additional plurality of buffers;
maintaining the additional plurality of buffers as a circular buffer system in which to store packets received via a first set of multiple ports;
determining an earliest received packet in the circular buffer system from amongst i) packets received via the first set of multiple ports and ii) packets to be transmitted via a second set of multiple of ports; and
dropping the earliest received packet in any of the buffers of the circular buffer system when there is insufficient space in the circular buffer system to store a packet newly received from any of the ports in the first set of multiple ports.

15. A method according to claim 14, further comprising, for each input port, dropping a packet received via the input port when the write pointer and the oldest read pointer both point to a same buffer location.

16. A network device according to claim 1, wherein the controller is configured to transmit the first command and to transmit the second command via one of the output ports.

17. A memory management system according to claim 6, wherein the controller is configured to cause the first command and to cause the second command to be transmitted via one of the output ports.

18. A method according to claim 11, wherein transmitting the first command comprises transmitting the first command via one of the output ports;
wherein transmitting the second command comprises transmitting the second command via one of the output ports.

* * * * *